United States Patent
Guo et al.

(10) Patent No.: US 12,271,327 B2
(45) Date of Patent: Apr. 8, 2025

(54) DEVICE, SYSTEM, AND METHOD FOR INSPECTING DIRECT MEMORY ACCESS REQUESTS

(71) Applicant: Intel Corporation, Santa Clara, CA (US)

(72) Inventors: Kaijie Guo, Shanghai (CN); Xin Zeng, Shanghai (CN); Ned Smith, Beaverton, OR (US); Weigang Li, Shanghai (CN); Junyuan Wang, Shanghai (CN); Songwu Shen, Shanghai (CN); Zijuan Fan, Shanghai (CN); Yao Huo, Shanghai (CN); Maksim Lukoshkov, Clarecastle Clare (IE); Laurent Coquerel, Limerick (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/035,705

(22) PCT Filed: Dec. 24, 2020

(86) PCT No.: PCT/CN2020/138920
§ 371 (c)(1),
(2) Date: May 5, 2023

(87) PCT Pub. No.: WO2022/133879
PCT Pub. Date: Jun. 30, 2022

(65) Prior Publication Data
US 2023/0418773 A1    Dec. 28, 2023

(51) Int. Cl.
*G06F 13/28*    (2006.01)
(52) U.S. Cl.
CPC .................. *G06F 13/28* (2013.01)

(58) Field of Classification Search
CPC ....................................................... G06F 13/28
See application file for complete search history.

(56) References Cited

U.S. PATENT DOCUMENTS 9,336,173 B1    5/2016  Sodke et al.
10,048,881 B2 *  8/2018  Sankaran .............. G06F 12/145
(Continued)

FOREIGN PATENT DOCUMENTS

WO    2020192462    10/2020

OTHER PUBLICATIONS

International Preliminary Report on Patentability from PCT/CN2020/138920 notified Jul. 6, 2023, 6 pgs.
(Continued)

*Primary Examiner* — David E Martinez
(74) *Attorney, Agent, or Firm* — Essential Patents Group, LLP

(57) ABSTRACT

Techniques and mechanisms for determining an operation to be performed with a direct memory access (DMA) request. An inspection unit (105) is coupled between an input-output memory management unit (IOMMU) (120) and an endpoint device (118). The inspection unit (105) stores a registry (330) comprising entries (332) which each correspond to a respective address, and a respective one or more resources of the endpoint device (118). A given entry (332) of the registry (330) is created based on a message from the IOMMU (120) which indicates the successful completion of an address translation to facilitate a DMA request. The endpoint device (118) performs a search, based on a DMA request, to determine if any registry (330) entry (332) indicates a combination of an address and an endpoint resource, where said combination matches a corresponding combination
(Continued)

indicated by the DMA request. Communication of the DMA request to the IOMMU (120) is contingent on a result of the search.

14 Claims, 18 Drawing Sheets

(56) References Cited

U.S. PATENT DOCUMENTS

| | | | |
|---|---|---|---|
| 2011/0320759 A1* | 12/2011 | Craddock | G06F 12/1081 |
| | | | 710/308 |
| 2018/0137069 A1 | 5/2018 | Vakharwala et al. | |
| 2020/0310997 A1* | 10/2020 | Chen | G06F 12/1036 |
| 2020/0371953 A1 | 11/2020 | Guo et al. | |

OTHER PUBLICATIONS

International Search Report and Written Opinion from PCT/CN2020/138920 notified Sep. 24, 2021, 10 pgs.

* cited by examiner

803

| 0 | 1 | 2 | 3 |
|---|---|---|---|
| 7 6 5 4 3 2 1 0 | 7 6 5 4 3 2 1 0 | 7 6 5 4 3 2 1 0 | 7 6 5 4 3 2 1 0 |
| 0 \| Fmt \| Type 00000 | R \| TC \| R | TD \| EP \| Attr \| R R \| AT | Length 0x001 |
| Requester ID | | Tag (unused) 0x00 | Last BE 0x0 \| 1st BE 0xF |
| Address [31:2] | | | R |
| Data DW0 | | | |

| 0 | 1 | 2 | 3 |
|---|---|---|---|
| 7 6 5 4 3 2 1 0 | 7 6 5 4 3 2 1 0 | 7 6 5 4 3 2 1 0 | 7 6 5 4 3 2 1 0 |
| 0 \| Fmt \| Type 00000 | R \| TC \| R | TD \| EP \| Attr \| R R \| AT | Length 0x001 |
| Requester ID | | Tag 0x0c | Last BE 0x0 \| 1st BE 0xF |
| Address [31:2] | | | R |

FIG. 8E

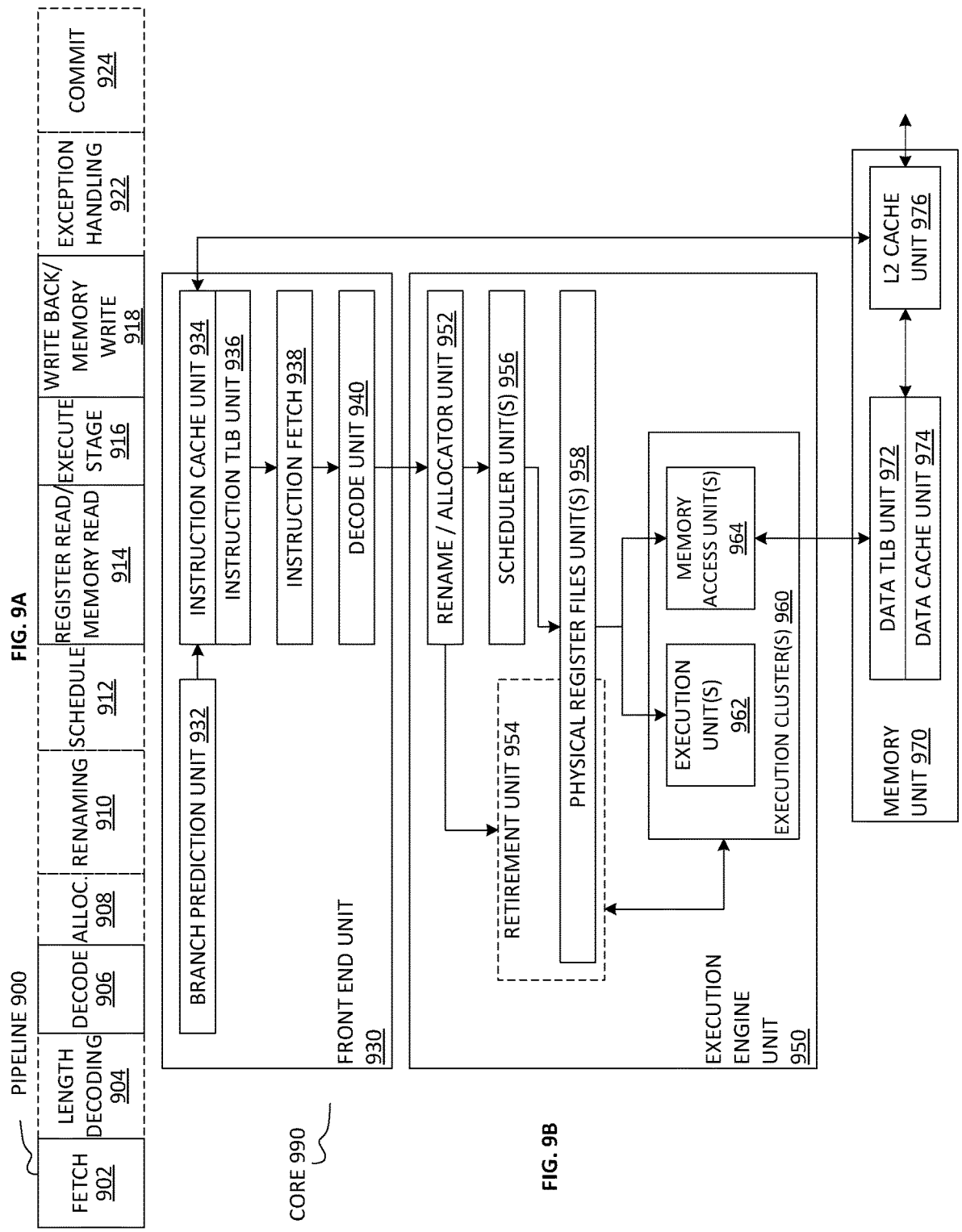

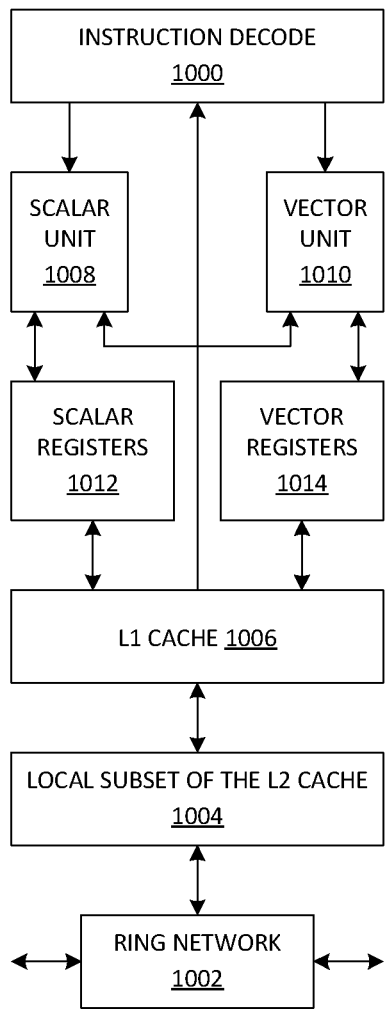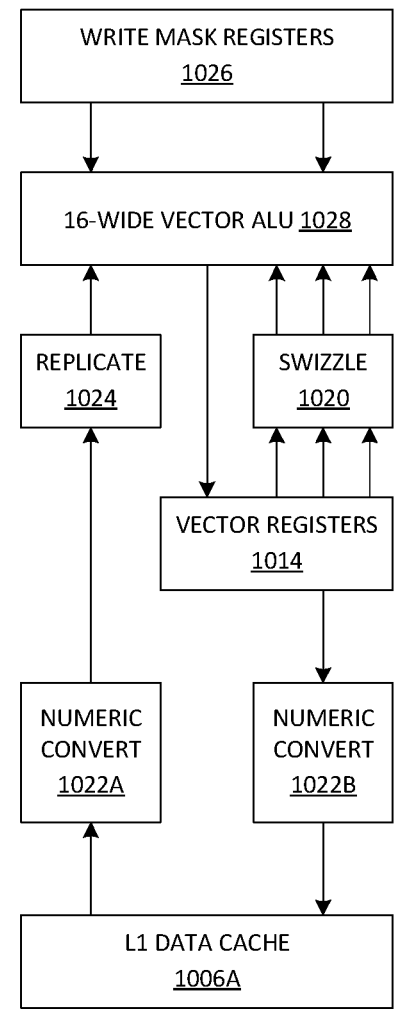
FIG. 10A
FIG. 10B

DEVICE, SYSTEM, AND METHOD FOR INSPECTING DIRECT MEMORY ACCESS REQUESTS

CLAIM OF PRIORITY

This Application is a National Stage Entry of, and claims priority to, PCT Patent Application No. PCT/CN2020/138920, filed on Dec. 24 2020 and titled "DEVICE, SYSTEM, AND METHOD FOR INSPECTING DIRECT MEMORY ACCESS REQUESTS," which is herein incorporated by reference in its entirety.

BACKGROUND

1. Technical Field

This disclosure generally relates to direct memory accesses and more particularly, but not exclusively, to verification of approved direct memory access requests.

2. Background Art

Computer systems have internal communication systems to transfer data. These internal communication systems include a set of interconnects. The interconnects provide data communication between the components of the system. However, these interconnects can also be bottlenecks for system performance if they are not able to keep up with the demands of the components of the system.

The peripheral component interconnect (PCI) system is a standard system for providing communication between a set of peripheral (e.g., endpoint) components and the other components of the computer system including the processor and the main memory. The PCI system has been periodically revised to increase its speed and throughput. The updated systems are known as PCI-X and the PCI express (PCIe) system. The PCI-X system is a shared bus with improved system performance over the original PCI system.

The PCIe system is a set of point-to-point interconnects with further improvements in performance. The PCIe system includes a root controller or port in a controller hub. The root controller is responsible for transmitting and receiving data from other components and placing it on the appropriate PCIe interconnect. The root port also receives data and requests from the peripheral components on the PCIe system and passes these data and requests to the appropriate component.

Often, one or more peripheral components make direct memory access (DMA) requests. DMA requests are to access areas of main memory to retrieve or write data. Peripheral components typically have a virtual address range assigned by an operating system that they are allowed to access and write to. A given peripheral component requests and retrieves mapping data that allows it to determine the physical addresses, corresponding to the virtual addresses used by the component, of the memory location for a DMA transaction. Requests for translation data often create excessive traffic over a PCIe system, degrading performance. Instead of servicing actual accesses to memory, the PCIe system must service address translation requests, thereby diminishing the throughput and speed of the PCIe system.

BRIEF DESCRIPTION OF THE DRAWINGS

The various embodiments of the present invention are illustrated by way of example, and not by way of limitation, in the figures of the accompanying drawings and in which:

FIGS. 8A through 8E illustrate data diagrams each showing respective features of a packet to be processed with an inspection unit according to a corresponding embodiment.

FIG. 9A is a block diagram illustrating both an exemplary in-order pipeline and an exemplary register renaming, out-of-order issue/execution pipeline according to embodiments of the invention.

FIG. 9B is a block diagram illustrating both an exemplary embodiment of an in-order architecture core and an exemplary register renaming, out-of-order issue/execution architecture core to be included in a processor according to embodiments of the invention;

FIGS. 10A through 10B illustrate a block diagram of a more specific exemplary in-order core architecture, which core would be one of several logic blocks (including other cores of the same type and/or different types) in a chip;

DETAILED DESCRIPTION

Figure 1A:
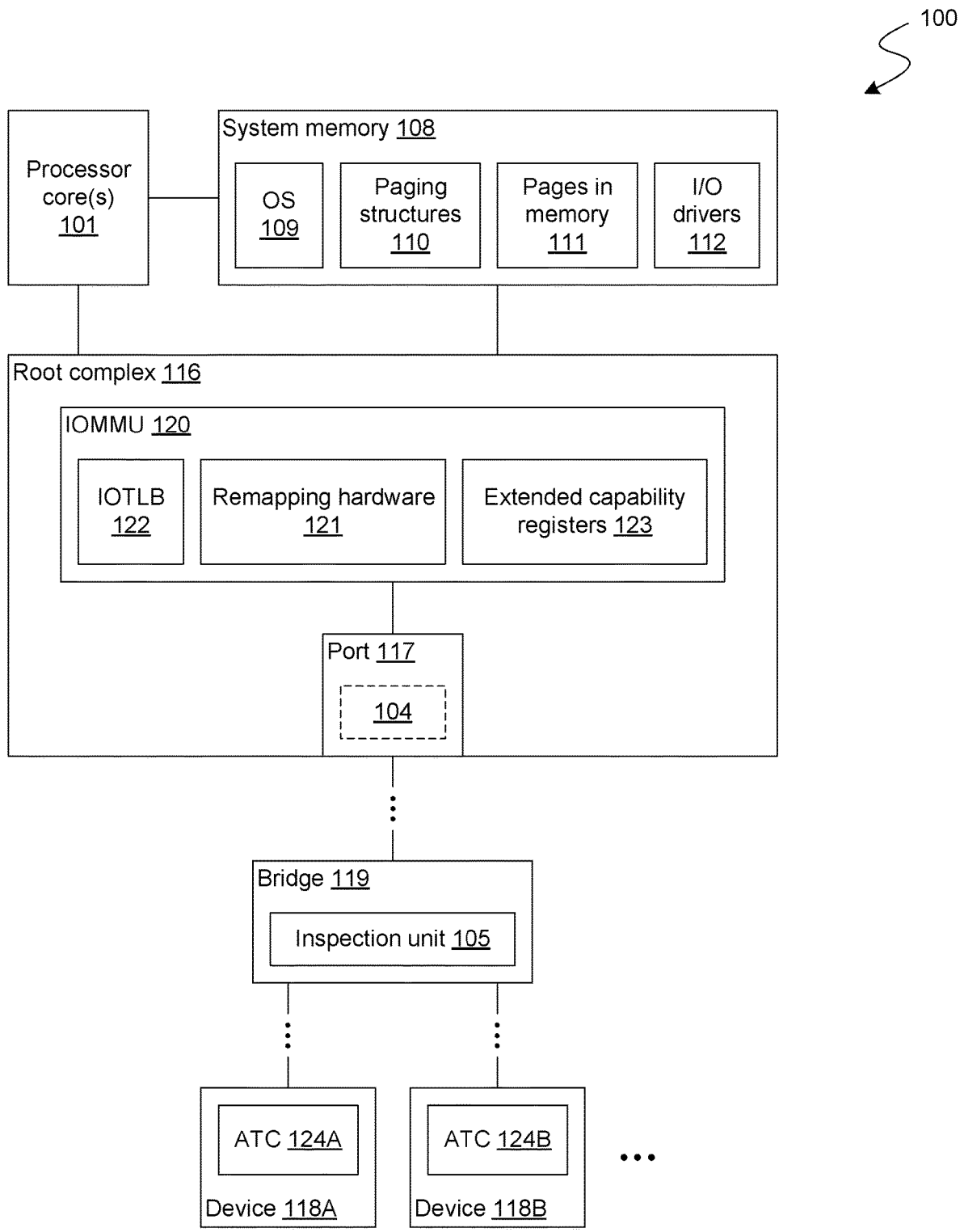
FIGS. 1A, 1B illustrate functional block diagrams each showing respective features of a system to detect an unauthorized direct memory access according to an embodiment.

Embodiments discussed herein variously provide techniques and mechanisms for determining one or more operations to be performed with a direct memory access (DMA) request. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including an inspection unit comprising circuitry to maintain and reference a registry of addresses for which direct memory accesses are authorized.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/− 10% of a target value. For example, unless otherwise specified in the explicit context of their use, the terms "substantially equal," "about equal" and "approximately equal" mean that there is no more than incidental variation between among things so described. In the art, such variation is typically no more than +/− 10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

FIG. 1A is a block diagram of a system 100 which provides functionality to maintain a registry of accessible addresses according to an embodiment. System 100 is one example of an embodiment which extends address translation service (ATS) functionality with circuitry, coupled between a translation agent and an endpoint device, that is operable to facilitate the detection of malicious or otherwise unauthorized direct memory accesses.

As shown in FIG. 1A, system 100 comprises, among other components, one or more processor cores 101 that each execute a respective one or more operating systems (e.g., including the illustrative operating system OS 109 shown) and/or other software processes. The system 100 also comprises a system memory 108 to store any of various data and data structures including, for example, state of OS 109, paging structures 110, data pages 111, and I/O driver(s) 112, and/or the like.

The system 100 further comprises a root complex (RC) 116—for example, comprising a memory controller hub—which is coupled between the processor cores 101 and system memory 108 and one or more endpoint devices (e.g., including the illustrative devices 118A, 118B shown). In various embodiments, root complex 116 is integrated into a chipset that integrates multiple functionalities such as an ability to execute in isolated execution mode, a host-to-peripheral bus interface, memory control, and/or the like.

In one embodiment, the devices 118A, 118B, etc. comprise one or more integrated devices (such as processor graphics) and/or one or more discrete devices (such as PCIe™ devices or other attached devices. By way of illustration and not limitation, devices 118A, 118B, etc. comprise one or more of a network controller device, storage controller device, peripheral controller device (like Universal Serial Bus (USB) controllers), media controller device, display controller, or the like. In various embodiments, some or all of devices 118A, 118B, etc. variously support address translation functionality—e.g., wherein device 118A and device 118B comprises address translation caches ATC 124A, ATC 124B, respectively.

The root complex 116 also comprises an input/output memory management unit (IOMMU) 120 which provides one or more endpoint devices (e.g., including some or all of devices 118A, 118B, etc.) with an address translation service. As used herein, "input/output memory management unit" or "IOMMU" (which, alternatively, is often called a "system memory management unit," or "SMMU") refers to any of a variety of devices which support communications, with a main memory and one or more endpoint devices, to facilitate DMA functionality whereby the one or more endpoint devices are to variously access the main memory. In various embodiments, circuitry of an IOMMU maps a given address—e.g., including a virtual address which has been provided (or is to be provided) to one such endpoint device—to a physical address which corresponds to a location in a main memory.

For example, IOMMU 120 comprises remapping hardware 121 that is configured to facilitate address translation for direct memory access (DMA) or other transactions, an I/O translation lookaside buffer (IOTLB) 122, in which to cache transactions and corresponding data, and extended capability registers 123 used to report to software enablement of various remapping features. DMA functionality of system 100 is facilitated with an address remapping architecture which supports address translation of DMA requests received by the root complex 116 from the devices 118. In an embodiment, hardware of IOMMU 120 accelerates the address-translation process by caching data from various translation structures. The IOTLB 122 is coupled to the remapping hardware 121. The translation caches of the IOTLB 122 are a finite resource that supports requests from multiple endpoint devices. As a result, efficiency of these translation caches in the system 100 platform depends, for example, on a number of simultaneously active DMA streams in the platform, and/or address locality of DMA accesses by the endpoint devices.

Some embodiments variously scale translation caches by enabling one or more of endpoint devices to participate in the remapping process with address translation caches implemented at said devices, e.g., with respective address translation caches ATC 124A and ATC 124B (which are also referred to as Device-TLBs) of devices 118A, 118B. Such ATCs alleviate pressure on the IOTLB 122 of the root complex 116, and provide opportunities for devices to improve performance by pre-fetching address translations before issuing DMA requests. For example, ATCs 124A and 124B can be particularly useful for devices with strict access latency requirements (such as isochronous devices), and for devices that have large DMA working sets and/or multiple active DMA streams. The remapping hardware 121 reports support for ATCs through an extended capability register 123. In one such embodiment, the ATCs 124A and 124B are further utilized by devices to support recoverable page faults.

Figure 1B:
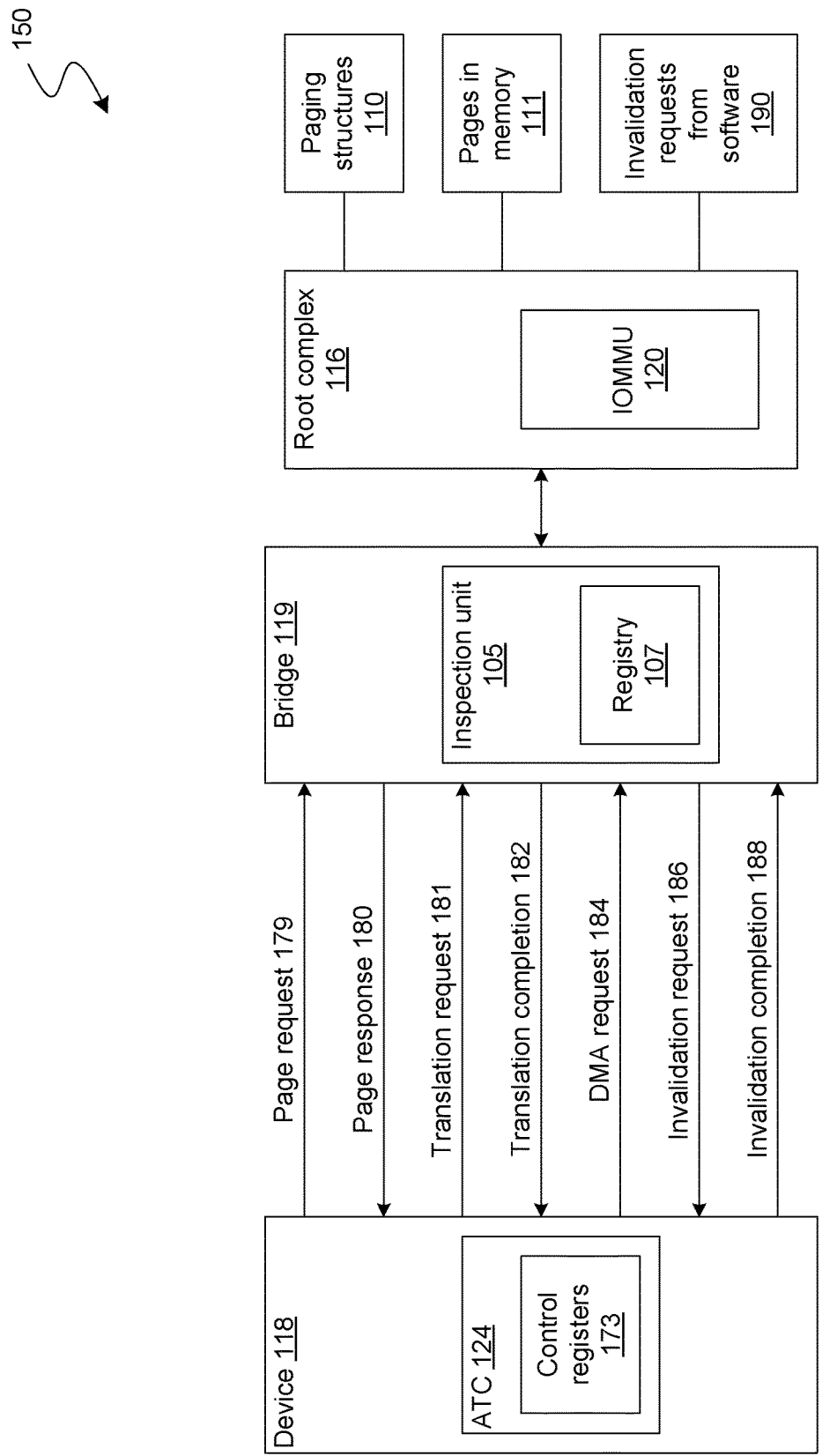

In various embodiments, employing a respective ATC in each of one or more endpoint devices involves operations adapted from conventional address translation service techniques and/or mechanism for various functions, such as, for example, to request and receive translations from the IOMMU 120 of the root complex 116, to indicate if a memory request has a translated or an un-translated address, and to invalidate translations cached at the ATCs 124A and 124B, all of which will be discussed in more detail with reference to FIG. 1B.

To mitigate the risk of a malicious or otherwise unauthorized DMA by an endpoint device, some embodiments variously provide circuitry—referred to herein as an "ATS inspection unit" (or, for brevity, an "inspection unit")—which is coupled between a translation agent, such as an IOMMU, and an endpoint device for which the translation agent provides an ATS. Such an ATS inspection unit maintains reference information—referred to herein as a "registry of accessible addresses" (or, for brevity, simply a "registry")—which is made available as a basis for detecting whether a requested DMA is authorized.

In various embodiments, such a registry—e.g., implemented with a table, linked list and/or any of various other suitable data structures—comprises one or more entries which each correspond to a respective address and a respective endpoint device (or at least some one or more resources of said endpoint device). For example, a given entry of the registry (or "registry entry" herein) includes or otherwise identifies one or more addresses—e.g., a range of multiple addresses—and further identifies a corresponding one or more endpoint resources which have received from the ATS (or are to receive) an identifier of the one or more addresses.

In the example embodiment shown, bridge 119 comprise an inspection unit 105 to maintain such a registry (not shown). In one such embodiment, a direct memory access request from one or more of devices 118A, 118B, etc. is received, snooped or otherwise detected by inspection unit 105. Circuitry of inspection unit 105—e.g., including a controller, application specific integrated circuit, programmable gate array and/or other suitable circuitry—evaluates the DMA request based on the registry of accessible addresses. For example, inspection unit 105 searches for any current entry which of the registry indicates a combination of an address and one or more endpoint resources, where said combination matches a similar combination indicated by the DMA request.

Based on a result of the search, inspection unit 105 selectively performs one of multiple possible operations with the DMA request. By way of illustration and not limitation, where the search indicates that a current registry entry matches the DMA request (and that the source of the DMA request is authorized for the requested DMA), inspection unit 105 forwards the DMA request to IOMMU 120. By contrast, where the search indicates that no current registry entry matches the DMA request (and that the DMA request is unauthorized), inspection unit 105 prevents such forwarding of the DMA request to IOMMU 120. In some embodiments, inspection unit 105 processes an unauthorized DMA request by dropping it entirely, or (alternatively) by modifying the DMA request with a tag or other value to indicate—for example—that the DMA should be prevented, least limited, tracked, or the like. In various embodiments, system 100 additionally or alternatively provides one or more inspection units each at any of various other locations (e.g., including the location in port 117 indicated by block 104) which are coupled between IOMMU 120 and a respective one or more endpoint devices.

FIG. 1B is a block diagram showing an example of communications 150 performed by system 100 with an endpoint device 118 (such as one of devices 118A, 118B) and bridge 119, wherein inspection unit 105 selectively determines one or more operations which are based on, or are to be a basis for, some or all such communications. As shown in FIG. 1B, device 118 comprises an address translation cache (ATC) 124 in which IOMMU 120 provides address information to facilitate direct memory accesses according to an embodiment. The ATC 124 further includes (or alternatively, is coupled to operate with) control registers 173 to enable capabilities and ATC behavior such as address translation services and page request support. Some embodiments variously extend on or otherwise adapt any of various address translation service specifications, wherein a memory request communicated between ATC 124 and IOMMU 120 via bridge 119 includes a transaction header with an "Address Type" (AT) field. This AT field indicates whether a transaction is a memory request with "Untranslated" address or a memory request with a "Translated" address. In various embodiments, such a specification also defines an ATC invalidation message.

In an illustrative scenario according to one embodiment, device 118 communicates with pages in memory 111 through bridge 119 and root complex 116—e.g., wherein IOMMU 120 uses paging structures 110 to perform translations that protect against unauthorized access to the pages in memory 111. In one instance, the ATC 124 sends a page request 179 to the root complex 116, to request a page from the pages in memory 111. In one such embodiment, page request 179 enables the ATC 124 to report a page fault to the IOMMU 120. In response, the IOMMU 120 responds with a page response 180—e.g., to allow the IOMMU to send a page fault response after servicing the page fault.

In some embodiments, the ATC 124 additionally or alternatively sends a translation request 181 to the IOMMU 120 with a virtual address (whether a guest virtual address (GVA), a host virtual address (HVA), or an I/O virtual address (IOVA)) for access to a corresponding host physical address (HPA). The IOMMU 120 then generates an address translation based on a mapping between the GVA (or, for example, a HVA or IOVA) and a guest physical address (GPA), and then a mapping between the GPA and the corresponding HPA, using various paging structures 110 and in relation to the pages 111 in memory. After completing address mapping in response to the translation request 181, IOMMU 120 responds to the ATC 124 with a translation completion message 182, which contains the HPA (assuming successful translation) and translation data that the device 118 uses to subsequently formulate a DMA request. The ATC 124 then sends the DMA request 184 (e.g., a memory read, write, or atomics request with an AT field and the HPA) to the IOMMU 120 to obtain needed data stored at the HPA. In some embodiments, device 118 receives from bridge 119 a response (not shown) to DMA request 184—e.g., wherein the response includes data read from pages in memory 111, an acknowledgement of a write to pages in memory 111, or a message indicating that a memory access based on DMA request 184 has been denied or has otherwise failed.

In various embodiments, IOMMU 120 additionally or alternatively sends an invalidation request 186 to the ATC 124 of the device 118 to invalidate a translation cached in the ATC 124, e.g., because the translation is stale or determined to be invalid for other reasons, such as in response to an invalidation request 186 from software running on the system 100. After the translation has been cleared from the ATC 124, the ATC 124 sends an invalidation completion message 188 to the root complex 116.

The following more-detailed explanation is specific to the PCI-Express™ Address Translation Services (ATS) specification and is given by way of example for explanatory purposes and for context throughout the remainder of this disclosure. Using the PCI-Express™ ATS specification, however, is not meant to be limiting of the aspects of the disclosure that also apply to other types of endpoint devices and protocols. In the following explanation, PASID stands for Process Address Space Identifier. Some DMA requests with a virtual address (or a guest virtual address) are tagged with a PASID value that identifies the targeted virtual address space.

Translation Request (181): Translation-requests-without-PASID specify the following attributes that are used by remapping hardware to process the request. Address Type (AT), where the AT field has value of 01b to identify it as a translation-request. Address, where an Address field indicates the starting input address for which the translation is requested. Length, where a Length field indicates how many sequential translations are returned in response to this request. Each translation is 8 bytes in length. If the length field has a value greater than two, then the additional translations (if returned in the translation response) are for sequentially increasing equal-sized pages starting at the requested input address. No Write (NW) flag, that when set, indicates if the endpoint is requesting read-only access for this translation. Translation requests with PASID specify the same attributes as above, and also specify these additional attributes: PASID value, Execute-Requested (ER) flag, and Privileged-mode-Requested (PR) flag in the PASID prefix.

Translation Completion (182): If the IOMMU 120 was not able to successfully process the translation request (with or without PASID), a translation completion without data is returned. A status code of UR (unsupported request) is returned in the translation completion if the IOMMU 120 is configured to not support translation requests from this device 118. A status code of CR (completer abort) is returned in the translation completion if the IOMMU 120 encountered errors when processing the translation request.

If the remapping hardware was able to successfully process a translation request, a translation completion with data is returned. For successful translation requests without PASID, each translation returned in the translation completion data specifies the following attributes. Size (S), where a value of 0b in Size field indicates the translation is for a 4-KByte page. If the Size field is 1b, the size of the translation is determined by the lowest bit in the translated address field (bits 63:12) with a value of 0. For example, if bit 12 is 0, the translation applies to an 8-KByte page. If bit 12 is 1 and bit 13 is 0, the translation applies to a 16-KByte page, and so on. Non-Snooped access flag (N) that, when set, the non-snooped access field indicates that the translated requests that use this translation must clear the No Snoop Attribute in the request. Untranslated access only flag (U) that, when set, the input address range for the translation can only be accessed by the device 118 using the untranslated request. Read permission (R) that, when set, read permission is granted for the input address range of this translation. If R is clear, read permission is not granted for the input address range of this translation. Write permission (W) that, when set, write permission is granted for the input address range of this translation. If W is clear, write permission is not granted for the input address range of this translation. Translated Address that, when either the R or W field is set, and the U field is clear, the Translated Address field contains the result of the translation for the respective input address. The device 118 can access the page through translated requests with this address.

For successful translation requests with PASID, each translation returned in the translation completion data specifies the same attributes as above, along with following extended attributes: Execute permission (EXE), where if EXE=R=1, execute permission is granted for the input address range of this translation, else, execute permission is not granted for the input address range of this translation. Privilege Mode Access (PRIV), which when set, R, W and EXE refer to permissions associated with privileged mode access, requiring translated requests with PASID using this translation to set the privileged-mode-requested flag in the PASID TLP prefix. If PRIV is clear, R, W, and EXE refer to permissions associated with nonprivileged access, requiring translated-requests with PASID using this translation to clear the privileged-mode-requested flag in the PASID TLP prefix. Global Mapping (G) that, when set, the translation is common across all PASIDs at this device 118. If G is clear, the translation is specific to the PASID value specified in the PASID prefix in the associated translation request, without global impact.

DMA Request (184): DMA requests are memory read, write, or atomics requests with address type (AT) field value of 10b. When generating requests to a given input (untranslated) address, the device 118 looks up the local ATC 124 for cached translation (result of previous translation requests) for the input address. If a cached translation is found with appropriate permissions and privilege, the device 118 generates a request (with AT=10b) specifying the translated address obtained from the ATC lookup. DMA requests are usually without PASID in referencing a translated HPA, but some embodiments support identification of a PASID in referencing a translated GPA.

Invalidation Request & Completion (186, 188): Invalidation requests are issued by, or otherwise on behalf of, software through remapping hardware to invalidate translations cached at endpoint device-TLBs. Invalidation-requests-without-PASID specify the following attributes. Device ID is an identity of the device (bus/device/function) whose ATC 124 is the target of invalidation. Size (S), where a value of 0b in the Size field indicates the target of invalidation is a 4-KByte input address range. If Size field is 1b, the input address range to be invalidated is determined by the lowest bit in the Untranslated Address field (bits 63:12) with a value of 0. Untranslated Address specifies the base of the input (untranslated) address range to be invalidated.

To mitigate the risk of an unauthorized direct memory access, inspection unit 105 maintains a registry 107 of addresses for respective memory locations, where endpoint resources are variously authorized each to access a corresponding one of said memory locations via DMA. By way of illustration and not limitation, based on IOMMU 120 sending translation completion message 182 to device 118 via bridge 119, inspection unit 105 creates an entry of registry 107 to indicate a correspondence of device 118 (or at least a component or other resource thereof) to the translated address. Subsequently, inspection unit 105 receives, snoops or otherwise detects identifiers—in DMA request 184—of the translated address and device 118 (or a resource thereof). With one or both such identifiers, inspection unit 105 performs a search of registry 107 to determine whether any current registry entry corresponds to said identifiers. Based on the search, inspection unit 105 selects one of multiple possible operations to perform with DMA request 184—e.g., wherein the operations include some or all of forwarding DMA request 184 to IOMMU 120, sending a modified version of DMA request 184 to IOMMU 120, or preventing communication of DMA request 184 to IOMMU 120.

Figure 2:
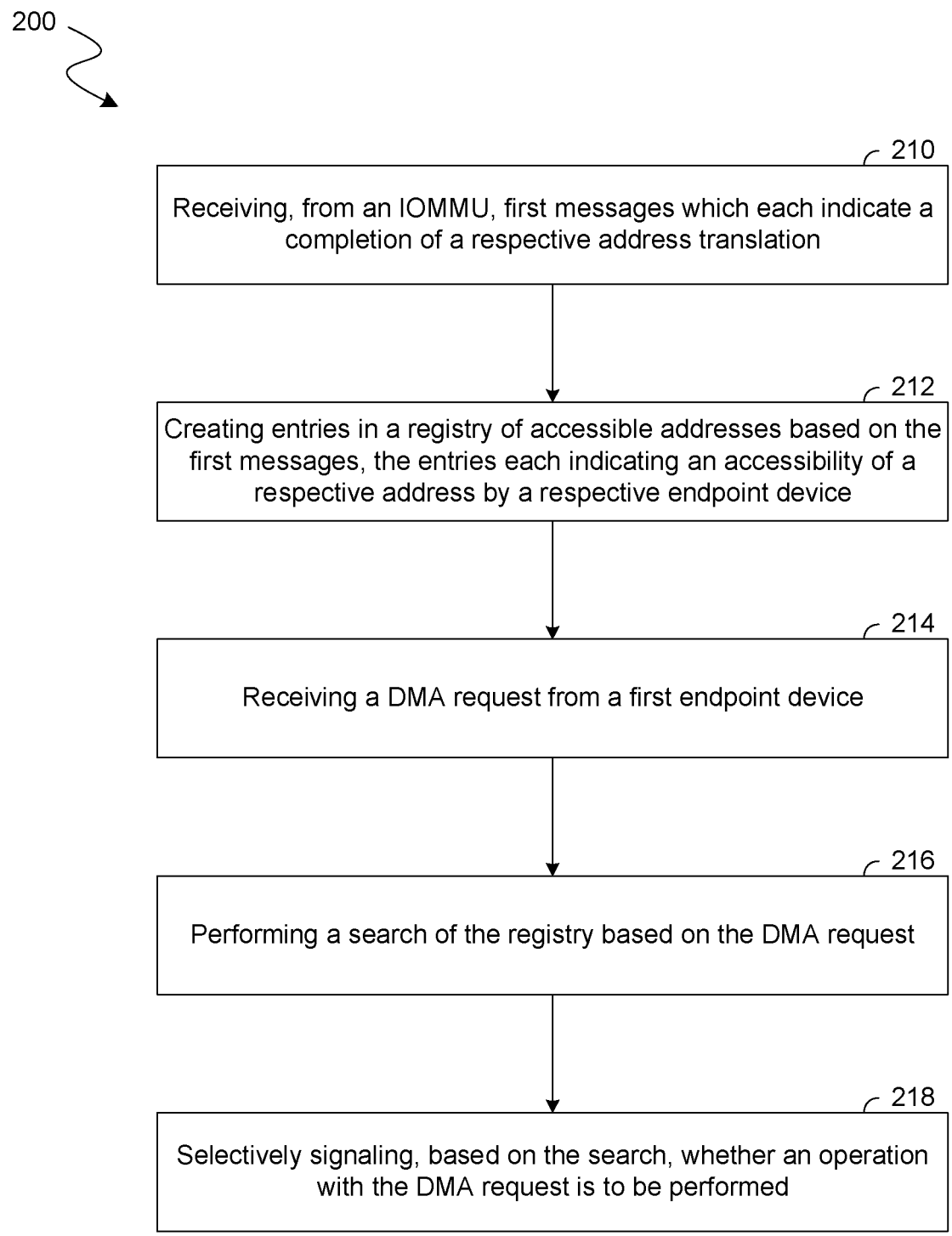
FIG. 2 illustrates a flow diagram showing features of a method to inspect a direct memory access request according to an embodiment.

FIG. 2 shows features of a method 200 to facilitate processing of a DMA request according to an embodiment. Method 200 is one example of an embodiment wherein a registry of accessible addresses is maintained based on translation completion messages from an ATS, and wherein communication of, and/or other operations with, a DMA request are performed based on said registry. Performance of method 200 provides some or all of the functionality of inspection unit 105, for example.

Figure 3:
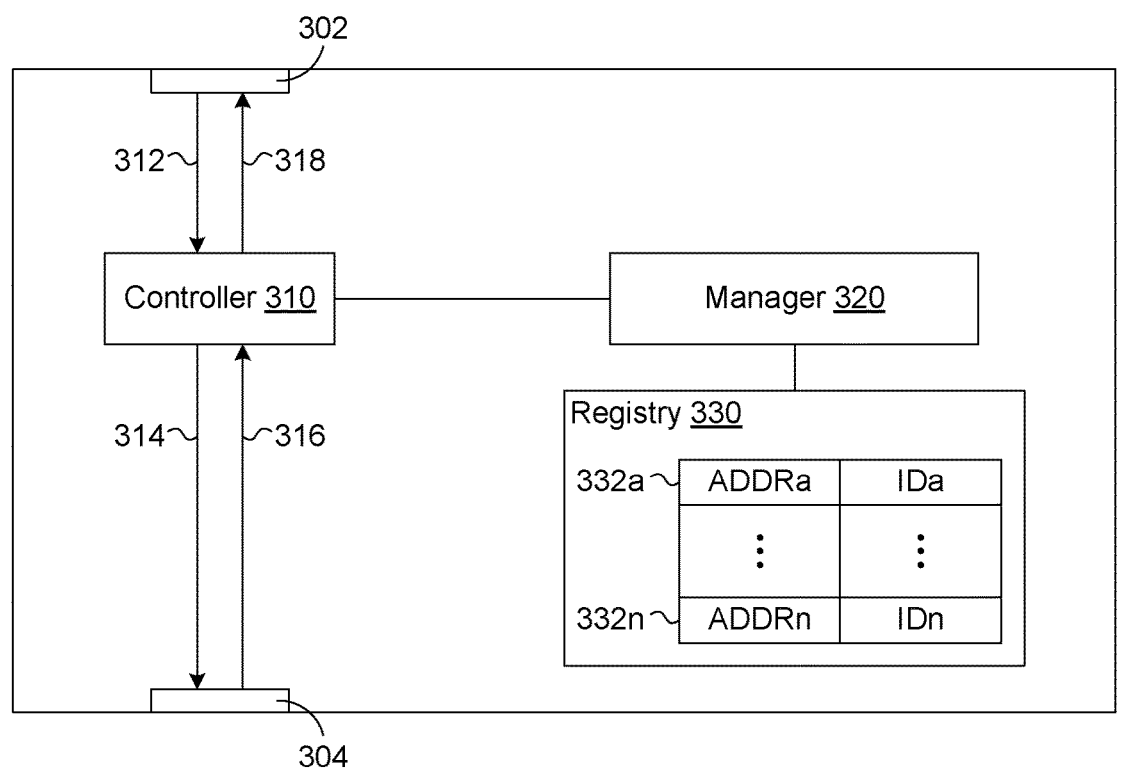
FIG. 3 illustrates a functional block diagram showing features of an inspection unit to determine an operation to perform with a direct memory access request according to an embodiment.

To illustrate certain features of various embodiments, method 200 is described herein with reference to an ATS inspection unit 300 which is shown in FIG. 3. In some embodiments, inspection unit 300 includes features of inspection unit 105—e.g., wherein some or all of method 200 is performed with inspection unit 300.

As shown in FIG. 2, method 200 comprises (at 210) receiving, from an IOMMU, first messages which each indicate a completion of a respective address translation. For example, referring now to FIG. 3, inspection unit 300 comprises a hardware interface 302—e.g., comprising transmitter circuitry and receiver circuitry—by which inspection unit 300 is to be coupled, directly or indirectly, to an address translation resource such as IOMMU 120 (for example). Inspection unit 300 further comprises another hardware interface 304 by which inspection unit 300 is to be coupled, directly or indirectly, to one or more endpoint devices including (for example) some or all of devices 118A, 118B, etc.

In one such embodiment, inspection unit 300 is coupled to receive via hardware interface 302 messages 312 which (for example) include one or more translation completion messages, one or more translation invalidation messages, one or more responses to DMA requests, and/or the like. A controller 310 of inspection unit 300 comprises circuitry to perform monitoring of messages 312 and, for example, to variously forward some or all of messages 312 (e.g., as messages 314 for communication via hardware interface 304). In one such embodiment, controller 310 is further coupled to receive a DMA request 316 via hardware interface 304—e.g., wherein controller 310 determines whether communications 318 (if any) are to be sent from inspection unit 300 via hardware interface 302 based on DMA request 316.

Referring again to FIG. 2, method 200 further comprises (at 212) creating entries in a registry of accessible addresses based on the first messages. The entries each indicate an accessibility of a respective address by a respective endpoint device. In one such embodiment, entries of the registry each specify or otherwise indicate that a respective one or more addresses correspond to some or all resources of a particular endpoint device—e.g., where such resource(s) receive the address(es), in a translation completion message from an ATS, for subsequent use to facilitate one or more direct memory accesses. For example, registry entries each identify a respective one or more addresses (e.g., by identifying an address range), and each comprise an identifier of one or more resources of a respective endpoint device.

For example, referring again to FIG. 3, a manager 320 of inspection unit 300 comprises circuitry to variously create, remove and/or search entries (e.g., including the illustrative entries 332a, . . . , 332n shown) in a registry 330 of accessible addresses. In an embodiment, controller 310 indicates to manager 320—e.g., in response to a translation completion message of messages 312—that an entry is to be added to registry 330. In some embodiments, controller 310 further additionally or alternatively indicates to manager 320—e.g., in response to invalidation completion message of messages 312—that the entry (or a different entry) is to be removed from registry 330.

In an illustrative scenario according to one embodiment, entry 332a of registry 330 comprises an identifier ADDRa of an address (e.g., a HPA) to be provided in a DMA request, and an identifier IDa of an endpoint device (or resource thereof) for which such a DMA request is authorized. Additionally, or alternatively, entry 332n of registry 330 comprises an identifier ADDRn of another address to be provided in a DMA request, and an identifier IDn of another endpoint device for which such a DMA request is authorized.

In one example embodiment, a given registry entry provides a generic identifier (e.g., a bus-device-function value for an endpoint device) to indicate that a direct memory access is to be provided for any DMA request from the corresponding endpoint device which targets an address identified by the registry entry. Additionally or alternatively, a registry entry provides a direct or indirect identifier (e.g., a PASID) of only a subset of resources at a given endpoint—e.g., wherein one or more other resources of the endpoint device are to be prevented from direct memory accesses based on the registry entry.

Referring again to FIG. 2, method 200 further comprises (at 214) receiving a DMA request from a first endpoint device. In an embodiment, the DMA request identifies an address—e.g., a translated address previously provided by the ATS—and an identifier of endpoint device (or at least a component, agent or other resource thereof) which generated the DMA request. Method 200 further comprises (at 216) performing a search of the registry, based on the DMA request, to determine whether any current entry of the registry identifies a combination of an address and one or more resources (where the combination matches a corresponding combination in the DMA request).

Method 200 further comprises (at 218) selectively signaling, based on the search, whether an operation—e.g., one of many possible operations with the DMA request—is to be performed. For example, the selective signaling at 218 comprises sending the DMA request to the IOMMU based on the search at 216 detecting a match between the DMA request and an entry of the registry. In another embodiment, the selective signaling at 218 comprises signaling that a communication of the DMA request to the IOMMU is to be prevented. In still another embodiment, the selective signaling at 218 comprises signaling that the DMA request is to be modified, prior to communication to the IOMMU, to provide a value which indicates a type of memory access which is to be denied to the first endpoint device.

Figure 4:
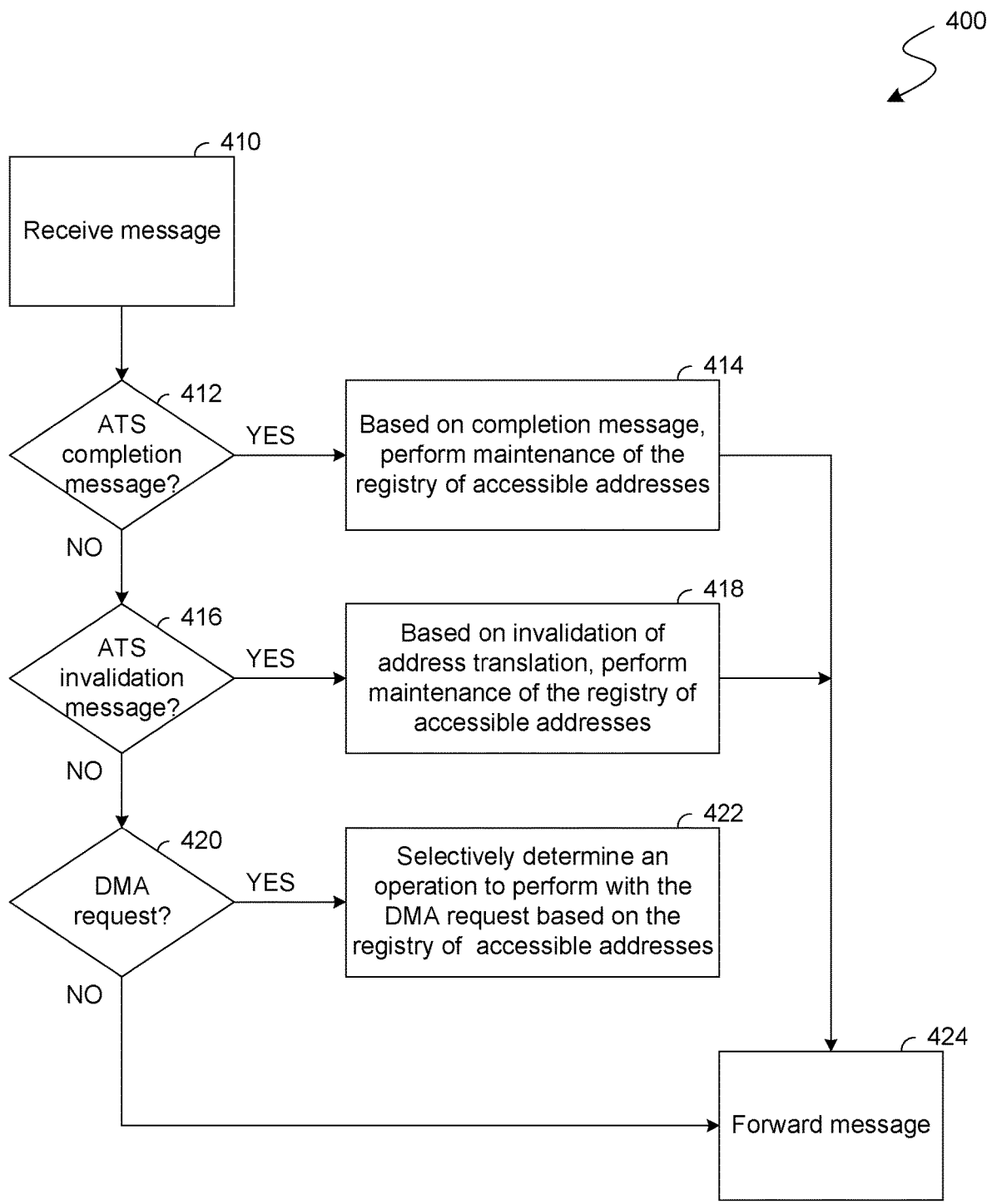
FIG. 4 illustrates a flow diagram showing features of a method to process messages received with an inspection unit according to an embodiment.

FIG. 4 shows operations of a method 400 to provide or use an entry in a registry of accessible addresses according to an embodiment. Operations of method 400 are performed, for example, inspection unit 105 or inspection unit 300—e.g., wherein method 200 includes or is otherwise performed with method 400.

As shown in FIG. 4, method 400 comprises (at 410) receiving a message at an inspection unit such as one of inspection units 105, 300. In an embodiment, the message is received at 410 from either of hardware interfaces 302, 304 (e.g., from either of IOMMU 120 or endpoint device 118A). Method 400 further comprises (at 412) determining whether the message received at 410 is an ATS translation completion message—e.g., translation completion message 182—which indicates whether a translation agent, such as an IOMMU, has completed an address translation.

By way of illustration and not limitation, FIGS. 8A-8E show respective message formats 800-804 which are compatible with Revision 1.1 of the Address Translation Services Specification published Jan. 26, 2009 by the Peripheral Component Interconnect Special Interest Group (PCI-SIG) of Beaverton, Oregon, USA. In some embodiments, messages—which are compatible each with a respective one of formats 800-804—are variously used by an ATS inspection unit each to create, remove, or search for a respective entry in a registry of accessible addresses. In FIGS. 8A-8E, various fields in message formats 800-804—e.g., including a status field, certain requester identifier fields, certain address fields, an ITag vector field, and address translation (AT) fields—are shaded to indicate information which used by such an inspection unit to maintain a registry of accessible addresses and/or to evaluate a DMA request based on such a registry.

Referring again to method 400, in one embodiment, the determining at 412 is based on one or both of the format 800 for a translation completion message, or the format 801 for a data entry to be communicated with a successful translation completion message. Where it is determined at 412 that the message received at 410 is a translation completion message, method 400 (at 414) performs one or more operations, based on the translation completion message, to maintain a registry of accessible addresses (such as inspection unit 105 or registry 330, for example). An example of such one or more operations is described herein with reference to the method 500 of FIG. 5. After the one or more operations at 414, the translation completion message (at 424) is forwarded to its destination—e.g., a targeted endpoint device.

Where it is instead determined at 412 that the message received at 410 is not a translation completion message, method 400 (at 416) determines whether the message received at 410 is an ATS translation invalidation message.

In one such embodiment, the determining at 416 is based on the format 802 (in FIG. 8C) for an invalidation completion message.

Where it is determined at 416 that the message received at 410 is a translation invalidation message, method 400 (at 418) performs one or more other operations, based on the translation invalidation message, to maintain the registry of accessible addresses. In an embodiment, the one or more other operations comprise searching for, and removing, a registry entry which identifies an address, and a corresponding endpoint resource, which are specified or otherwise indicated by the translation invalidation message. After the one or more other operations at 418, the translation invalidation message (at 424) is forwarded to its destination—e.g., a targeted endpoint device.

Where it is instead determined at 416 that the message received at 410 is not a translation invalidation message, method 400 determines (at 420) whether the message received at 410 is a DMA request from an endpoint device. In one such embodiment, the determining at 420 is based on one or both of the format 803 (in FIG. 8D) for a data write request, or the format 804 (in FIG. 8E) for a data read request.

Where it is determined at 420 that the message received at 410 is a DMA request, method 400 (at 422) selectively determines, based on the registry of accessible addresses, an operation to be performed with the DMA request. One example of operations to provide such selective determining are described herein with reference to method 600 in FIG. 6. Where it is instead determined at 420 that the message received at 410 is not a DMA request, method 400 (at 424) forwards the message to a targeted destination device.

Figure 5:
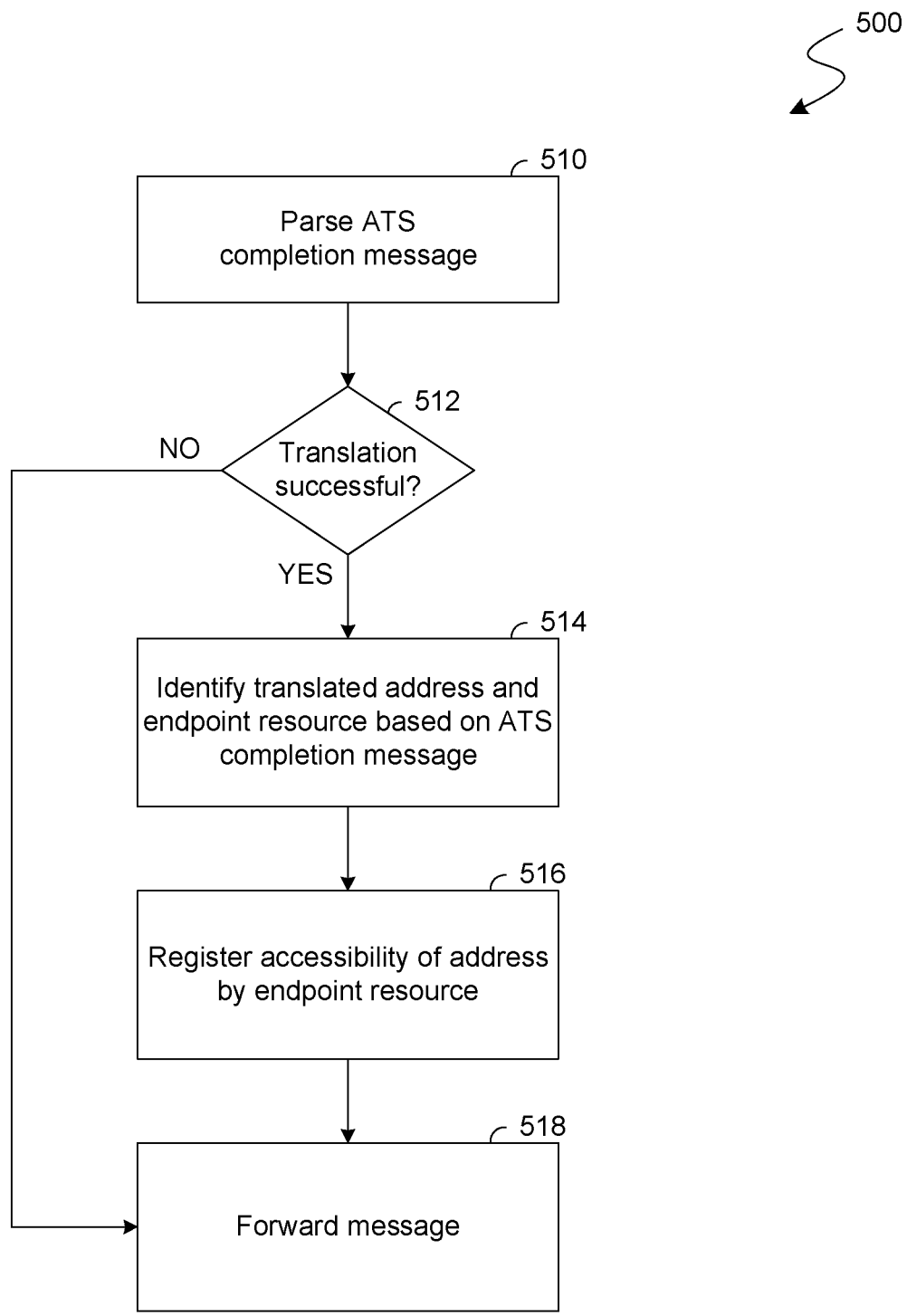
FIG. 5 illustrates a flow diagram showing features of a method to maintain a registry of accessible addresses with an inspection unit according to an embodiment.

FIG. 5 shows operations of a method 500 to selectively provide an entry in a registry of accessible addresses according to an embodiment. Operations of method 500 are performed, for example, inspection unit 105 or inspection unit 300—e.g., wherein one of methods 200, 400 includes or is otherwise performed with method 500.

As shown in FIG. 5, method 500 comprises (at 510) parsing a translation completion message to identify one or more fields thereof—e.g., wherein the translation completion message is compatible with one or both of formats 800, 801. Method 500 further comprises determining (at 512) whether the translation completion message parsed at 510 indicates that an address translation has completed successfully. By way of illustration and not limitation, successful translation is indicated by the Status field in format 800 being equal to the binary value '0000.'

Where it is determined at 512 that the address translation did not complete successfully, method 500 (at 518) forwards the message to an endpoint device which (for example) requested a translated address to be used subsequently in one or more DMA requests. Where it is instead determined at 512 that the address translation did complete successfully, method 500 (at 514) determines, based on the translation completion message, a translated address—such as a HPA—and an identifier of one or more resources of the endpoint device which requested the translated address. Based on the identifiers determined at 514, method 500 (at 516) creates in the registry of accessible addresses an entry which registers an accessibility of the translated address by the one or more resources of the endpoint device.

Figure 6:
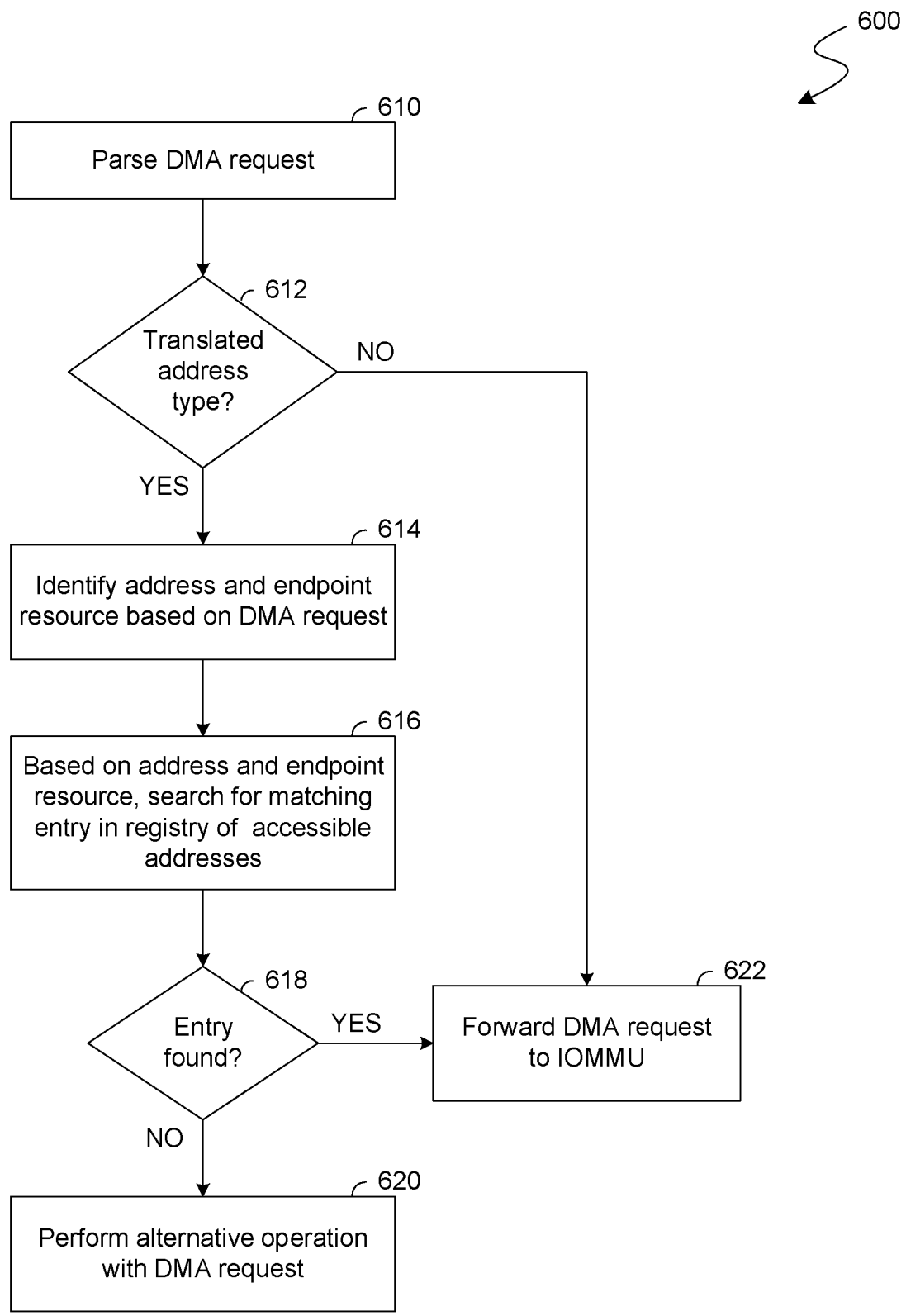
FIG. 6 illustrates a flow diagram showing features of a method to evaluate a direct memory access request based on a registry of accessible addresses according to an embodiment.

FIG. 6 shows operations of a method 600 to determine a processing of a DMA request according to an embodiment. Operations of method 600 are performed, for example, inspection unit 105 or inspection unit 300—e.g., wherein one of methods 200, 400 includes or is otherwise performed with method 600.

As shown in FIG. 6, method 600 comprises (at 610) parsing a request—e.g., based on one or both of formats 803, 804 (in FIGS. 8D, 8E)—and, based on such parsing, determining (at 612) whether the request is a DMA request which includes a translated type of address. In one embodiment, the determining at 612 is based, for example, on the value of an address type (AT) field in one of formats 803, 804. Where it is determined at 612 that the request does not include a translated address, method 600 (at 622) forwards the request to an IOMMU (or other targeted device).

Where it is instead determined at 612 that the request is a DMA request which comprises a translated address, method 600 (at 614) determines, based on the parsing at 610, the translated address—such as a HPA—and an identifier of one or more endpoint resources which sent the DMA request. Based on the identifiers determined at 614, method 600 (at 616) searches for a matching entry in a registry of accessible addresses. Method 600 further comprises (at 618) determining whether the searching at 616 has found any such matching registry entry.

Where it is determined at 618 that the registry includes a matching entry (indicating that the requested direct memory access is authorized), method 600 (at 622) forwards the DMA request to a targeted IOMMU or other translation agent. Where it is instead determined at 618 that no such matching registry has been found, method 600 (at 620) performs an alternative operation with the DMA request (that is, other than the forwarding at 622).

For example, in some embodiments, the alternative operation at 620 comprises dropping the DMA request, to prevent any communication thereof to the IOMMU. In another embodiment, the alternative operation at 620 comprises modifying the DMA request (prior to communication to the IOMMU) to include a tag value or other information which indicates that any memory access based on the DMA request is to be prevented, limited, tracked, or the like.

Figure 7:
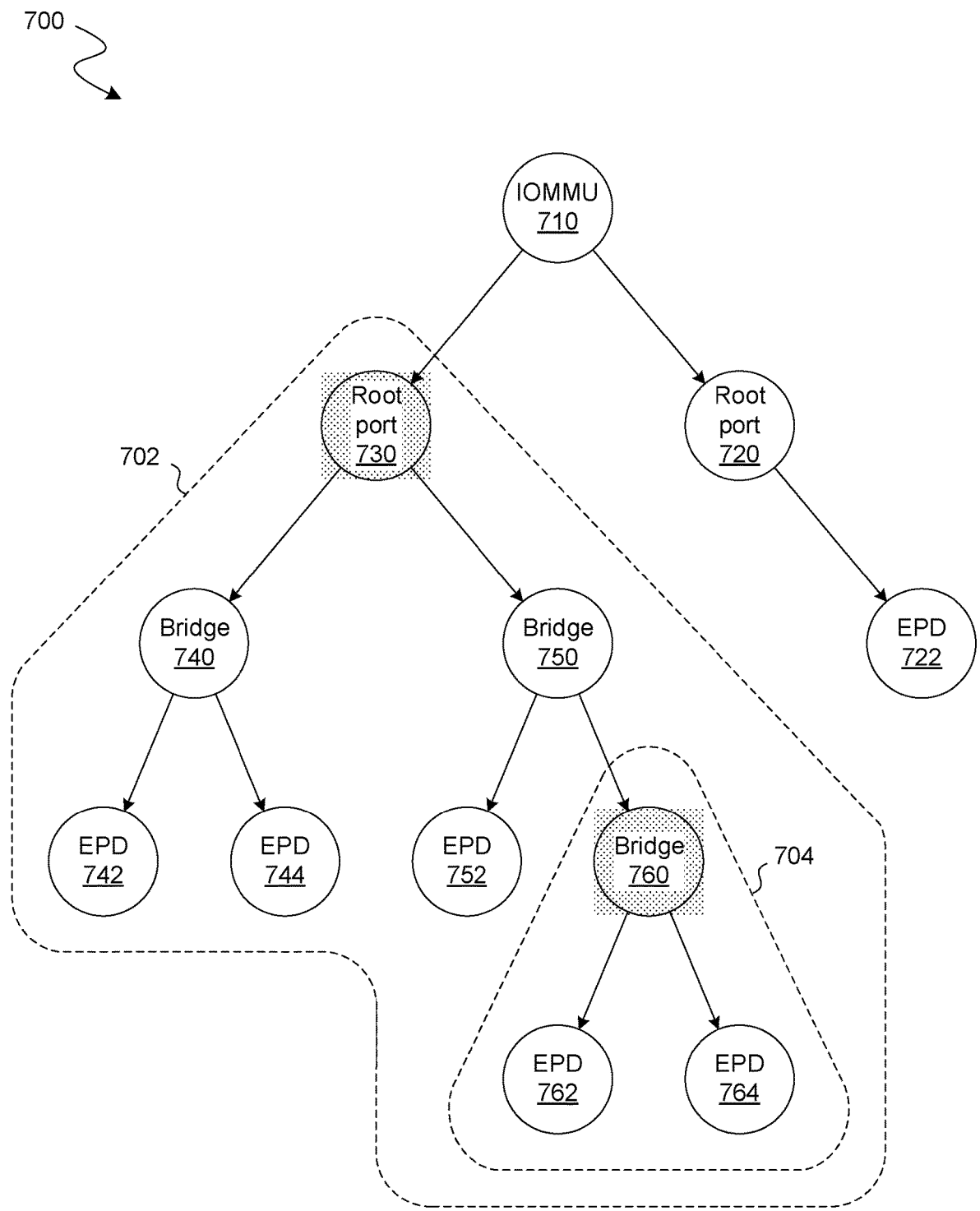
FIG. 7 illustrates a block diagram showing features of a system comprising hierarchical arrangement of inspection units according to an embodiment.
Figure 8A:
Figure 8B:
Figure 8C:

In some embodiments, an inspection unit supports communications with one or more other inspection units—e.g., where such communications are to determine which of the inspection units is to maintain a registry of accessible addresses for one or more devices in a hierarchical architecture of a platform. For example, FIG. 7 shows a system 700 comprising a hierarchical arrangement of devices including (for example) an IOMMU 710 of a root complex, and root ports 720, 730 of the root complex. In one such embodiment, system 700 further comprises endpoint devices, and one or more bridges which are variously coupled each between the root complex and a respective one or more endpoint devices.

By way of illustration and not limitation, an endpoint device (EPD) 722 of system 700 is coupled to IOMMU 710 via root port 720—e.g., wherein bridges 740, 750 are coupled to IOMMU 710 via root port 730, and wherein EPDs 742, 744 are variously coupled to access the root complex via bridge 740, and root port 730. Furthermore, another bridge 760 is coupled to root port 730 via bridge 750—e.g., wherein an EDP 752 is coupled to bridge 750, and wherein EPDs 762, 764 are coupled to access the root complex via bridges 760, 750, and root port 730. In one such embodiment, some or all devices of the hierarchical arrangement are variously coupled to each other via respective PCIe interfaces.

To facilitate security of direct memory accesses, multiple nodes of system 700—which are variously coupled between IOMMU 710 and a respective one or more EDPs—each comprise a respective inspection unit that (for example) provides functionality of one of inspection units 105, 300. In the example embodiment shown, root port 730 and bridge 760 each comprise such an inspection unit. In one such embodiment, the inspection units of root port 730 and bridge 760 comprise respective circuitry to support a protocol according to which communications take place to negotiate which inspection unit is to maintain a registry of accessible addresses for use in determining whether and/or how a given DMA request is to be processed. In an illustrative scenario according to one embodiment, bridge 760 is chosen to maintain a registry in aid of detecting unauthorized DMA requests generated in a region 704 of the hierarchical arrangement. In an alternative scenario according to a different, root port 730 is chosen to maintain a registry in aid of detecting unauthorized DMA requests generated in a larger region 702 of the hierarchical arrangement.

The figures described herein detail exemplary architectures and systems to implement embodiments of the above. In some embodiments, one or more hardware components and/or instructions described herein are emulated as detailed below, or implemented as software modules.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
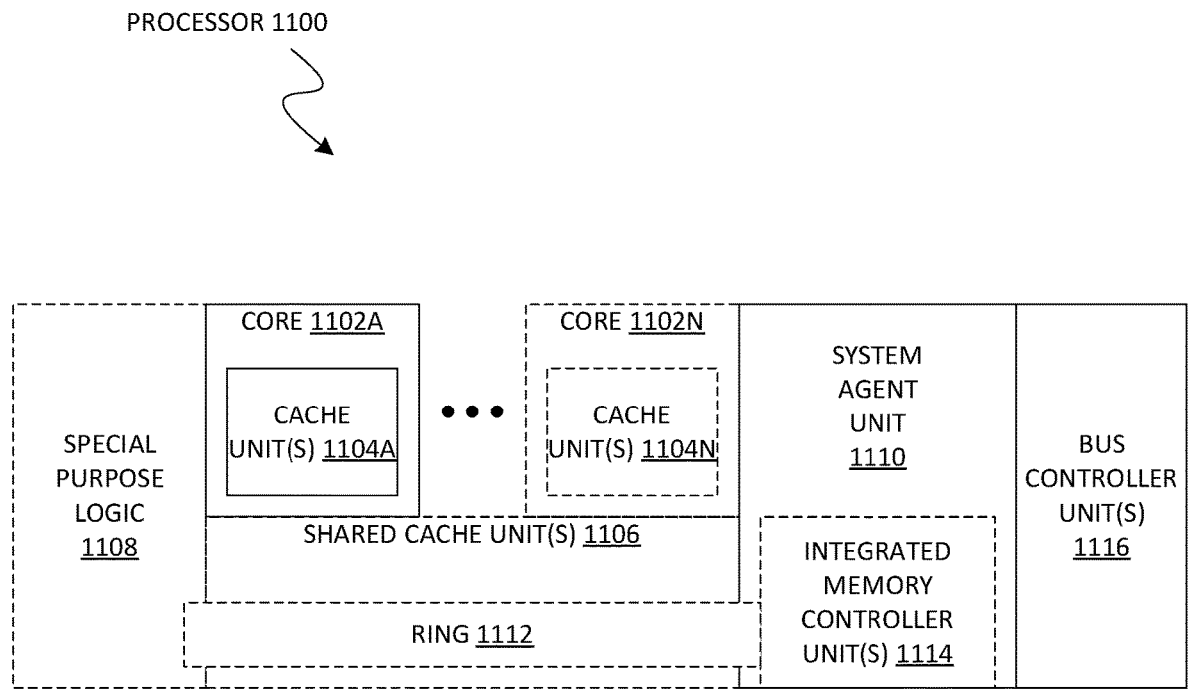
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes respective one or more levels of caches 1104A-N within cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the special purpose logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12 through 15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
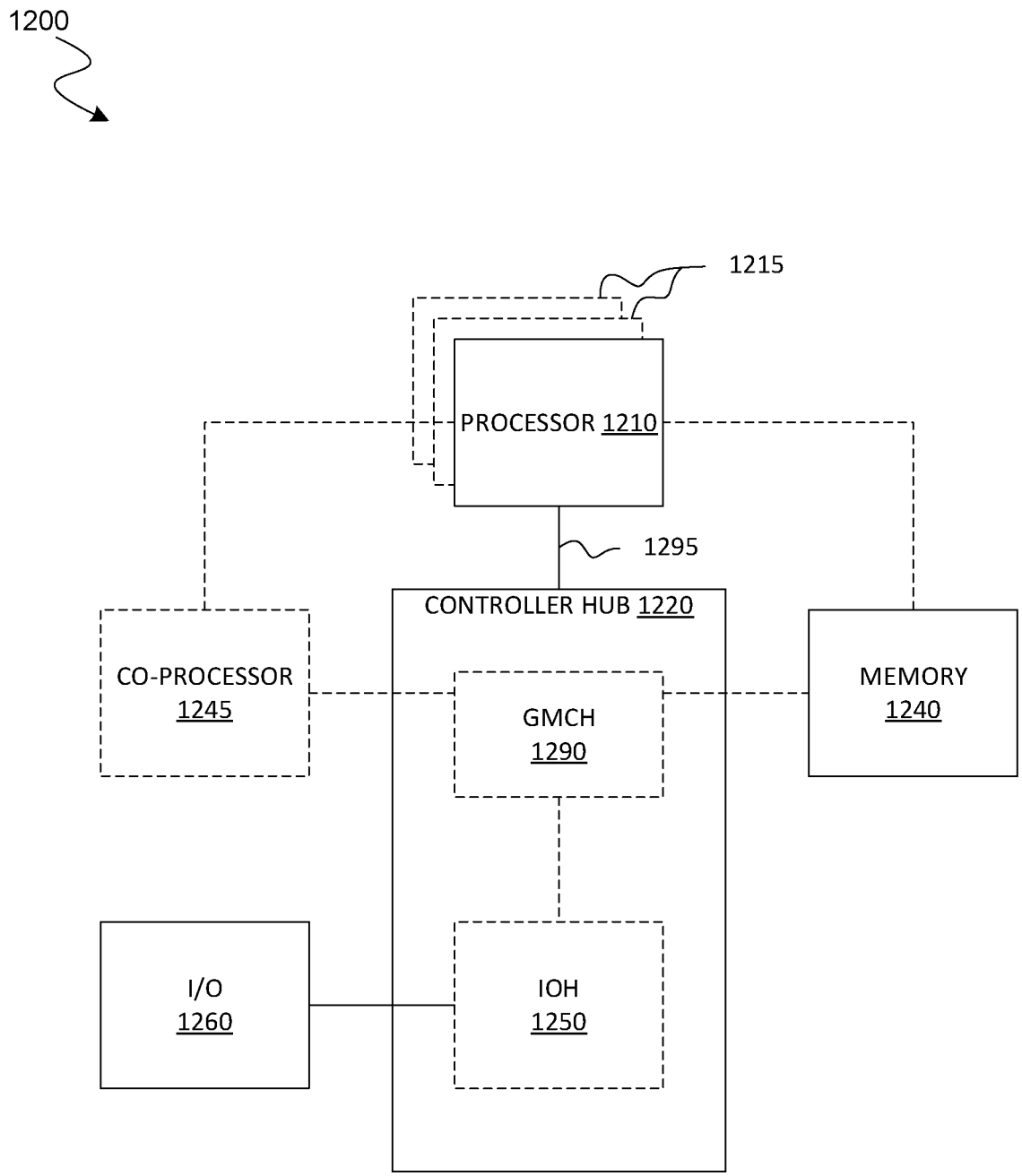
FIGS. 12 through 15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the processors 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
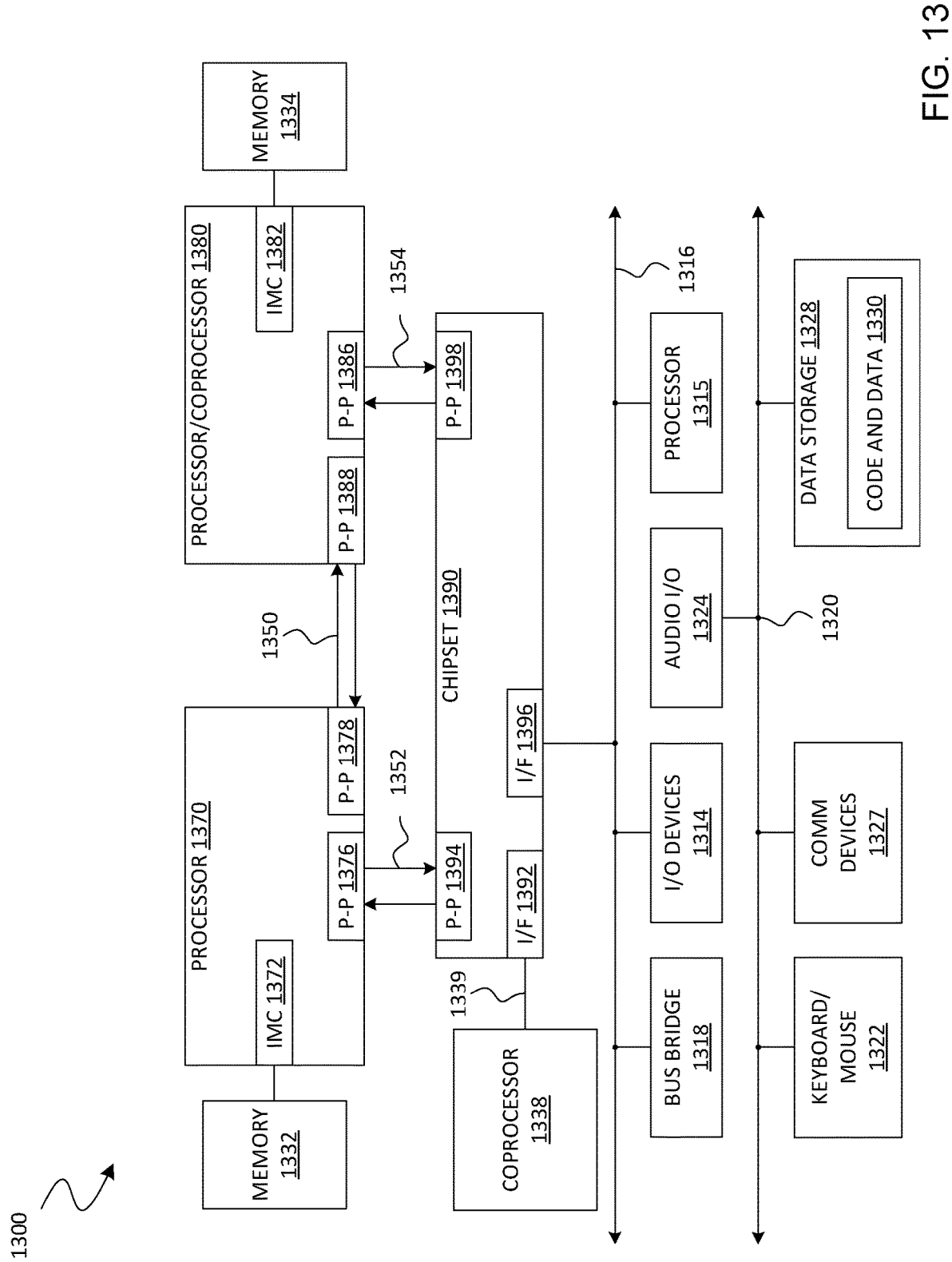

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller unit's point-to-point (P-P) interfaces 1376 and 1378; similarly, second processor 1380 includes P-P interfaces 1386 and 1388. Processors 1370, 1380 may exchange information via a point-to-point (P-P) interconnect 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1392 and an interconnect 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
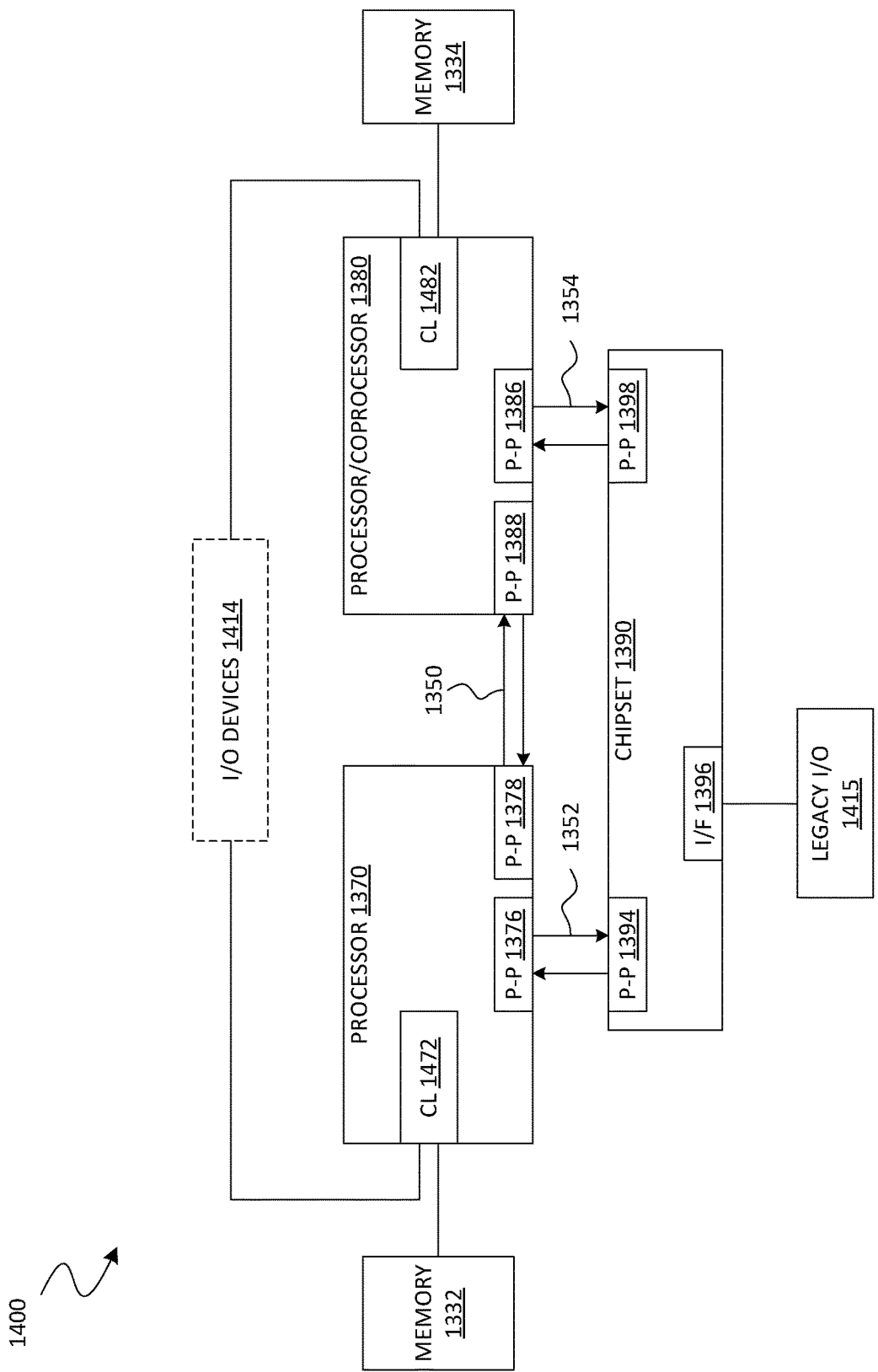

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1472 and 1482, respectively. Thus, the CL 1472, 1482 include integrated memory controller units and include I/O control logic. FIG. 14 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Figure 15:
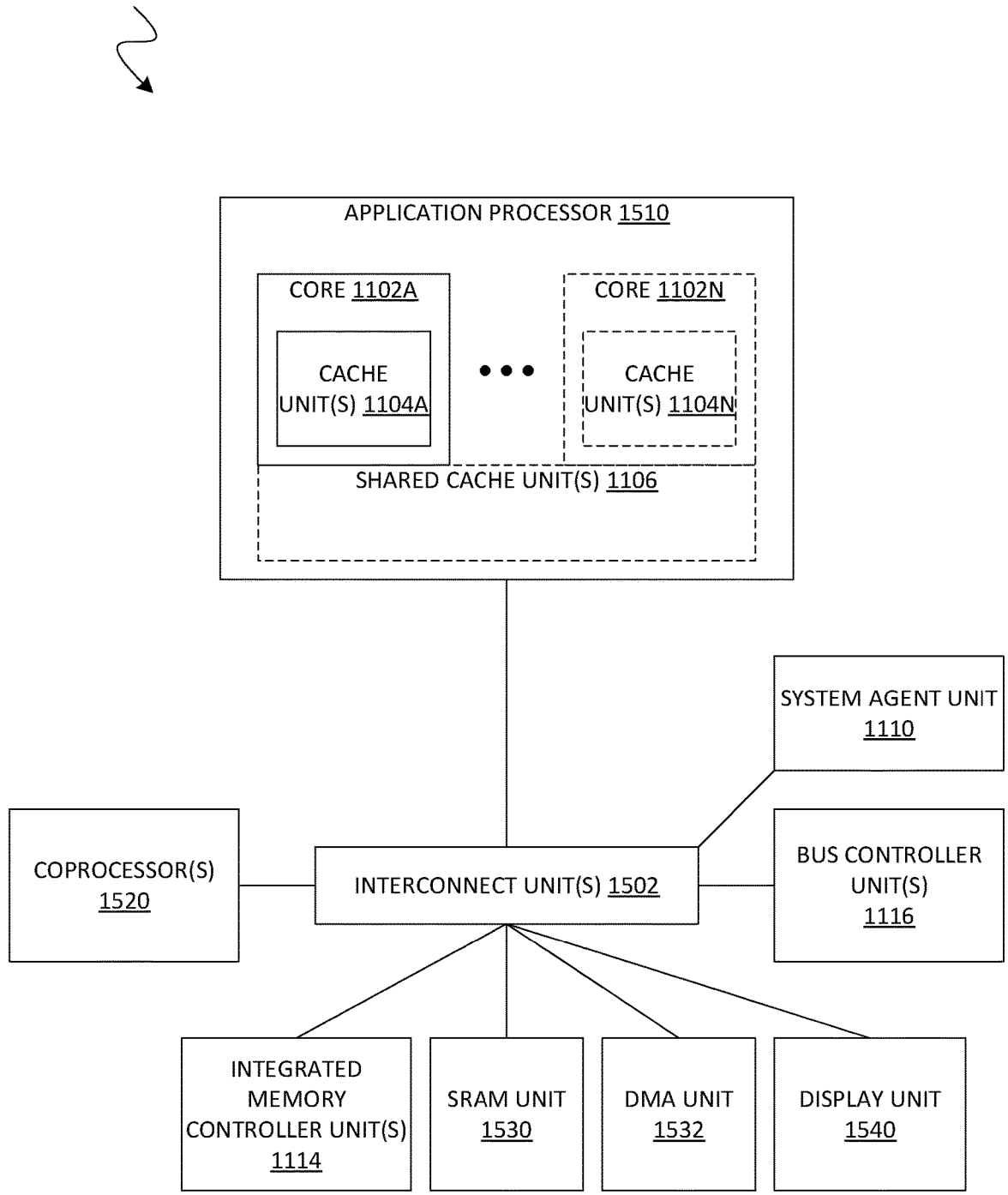

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
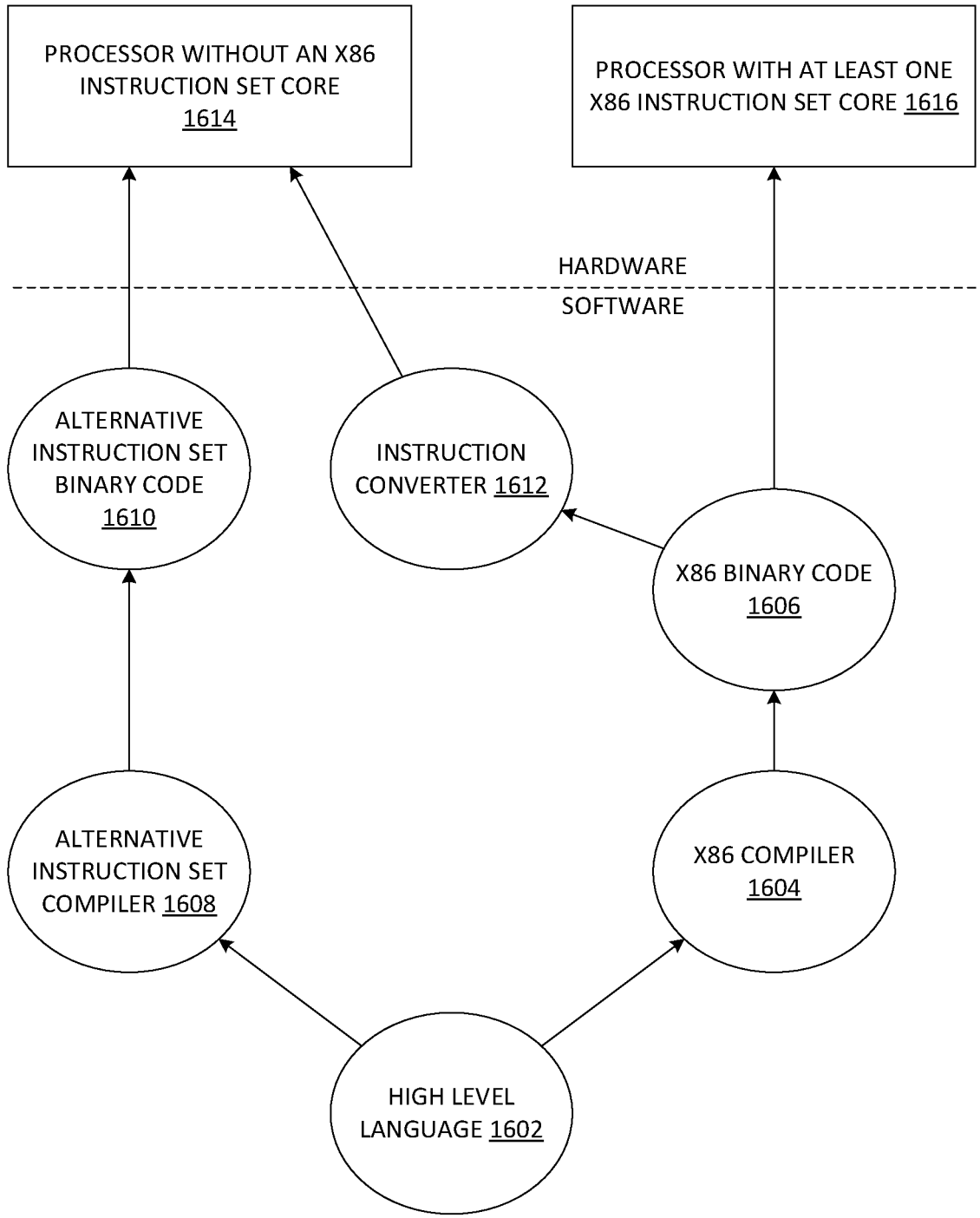
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

In one or more first embodiments, a device comprises a first hardware interface to couple the device to an input-output memory management unit (IOMMU), a second hardware interface to couple the device to a first endpoint device, manager circuitry to create entries of a registry of accessible addresses, the entries each based on a respective one of first messages received via the first hardware interface, wherein the first messages each indicate a completion of a respective address translation, the entries each to indicate an accessibility of a respective address by a respective endpoint device of one or more endpoint devices including the first endpoint device, and controller circuitry coupled to the manager circuitry, the first hardware interface, and the second hardware interface, the controller circuitry to receive a direct memory access (DMA) request from the first endpoint device, to signal the manager circuitry to perform an address search of the registry based on the DMA request, and to selectively signal, based on the address search, whether an operation with the DMA request is to be performed.

In one or more second embodiments, further to the first embodiment, the controller circuitry to selectively signal whether the operation with the DMA request is to be performed comprises the controller circuitry to send the DMA request to the IOMMU based on the address search detecting a match between the DMA request and an entry of the registry.

In one or more third embodiments, further to the first embodiment or the second embodiment, the controller circuitry to selectively signal whether the operation with the DMA request is to be performed comprises the controller circuitry to signal that a communication of the DMA request to the IOMMU is to be prevented.

In one or more fourth embodiments, further to any of the first through third embodiments, the controller circuitry to selectively signal whether the operation with the DMA request is to be performed comprises the controller circuitry to signal that the DMA request is to be modified to provide a value which indicates a type of memory access which is to be denied to the first endpoint device.

In one or more fifth embodiments, further to any of the first through fourth embodiments, the entries comprise a first entry which comprises a first address and a bus-device-function value.

In one or more sixth embodiments, further to any of the first through fifth embodiments, the entries comprise a first entry which comprises a first address and a process address space identifier.

In one or more seventh embodiments, further to any of the first through sixth embodiments, the device is to be coupled between an inspection unit and the IOMMU, and wherein the controller circuitry is further to participate in a negotiation with the inspection unit to determine which of the inspection unit or the device is to maintain the registry.

In one or more eighth embodiments, further to any of the first through seventh embodiments, the controller circuitry is further to receive one or more second messages which indicates an assignment of workloads each to a respective agent, and signal the manager circuitry to create one or more other entries in the registry based on the one or more second messages.

In one or more ninth embodiments, a method at an inspection unit comprises receiving first messages from an input-output memory management unit (IOMMU), wherein the first messages each indicate a completion of a respective address translation, and wherein the inspection unit is coupled between the IOMMU and a first endpoint device, creating entries in a registry of accessible addresses based on the first messages, the entries each indicating an accessibility of a respective address by a respective endpoint device, receiving a direct memory access (DMA) request from the first endpoint device, performing an address search of the registry based on the DMA request, and selectively signaling, based on the address search, whether an operation with the DMA request is to be performed.

In one or more tenth embodiments, further to the ninth embodiment, selectively signaling whether the operation with the DMA request is to be performed comprises sending the DMA request to the IOMMU based on the address search detecting a match between the DMA request and an entry of the registry.

In one or more eleventh embodiments, further to the ninth embodiment or the tenth embodiment, selectively signaling whether the operation with the DMA request is to be performed comprises signaling that a communication of the DMA request to the IOMMU is to be prevented.

In one or more twelfth embodiments, further to any of the ninth through eleventh embodiments, selectively signaling whether the operation with the DMA request is to be performed comprises signaling that the DMA request is to be modified to provide a value which indicates a type of memory access which is to be denied to the first endpoint device.

In one or more thirteenth embodiments, further to any of the ninth through twelfth embodiments, the entries comprise a first entry comprising a first address and a bus-device-function value.

In one or more fourteenth embodiments, further to any of the ninth through thirteenth embodiments, the entries comprise a first entry comprising a first address and a process address space identifier.

In one or more fifteenth embodiments, further to any of the ninth through fourteenth embodiments, another inspection unit is coupled to the IOMMU via the inspection unit, wherein the method further comprises participating in a negotiation with the other inspection unit to determine which of the inspection unit or the other inspection unit is to maintain the registry.

In one or more sixteenth embodiments, further to any of the ninth through fifteenth embodiments, the method further comprises receiving one or more second messages indicating an assignment of workloads each to a respective agent, and creating one or more other entries in the registry based on the one or more second messages.

In one or more seventeenth embodiments, a system comprises a memory, an input-output memory management unit (IOMMU), a first endpoint device coupled to the memory via the IOMMU, an inspection unit coupled between the IOMMU and the first endpoint device, the inspection unit comprising manager circuitry to create entries of a registry of accessible addresses, the entries each based on a respective one of first messages received via the first hardware interface, wherein the first messages each indicate a completion of a respective address translation, the entries each to indicate an accessibility of a respective address by a respective endpoint device of one or more endpoint devices including the first endpoint device, and controller circuitry coupled to the manager circuitry, the controller circuitry to receive a direct memory access (DMA) request from the first endpoint device, to signal the manager circuitry to perform an address search of the registry based on the DMA request, and to selectively signal, based on the address search, whether an operation with the DMA request is to be performed.

In one or more eighteenth embodiments, further to the seventeenth embodiment, the controller circuitry to selectively signal whether the operation with the DMA request is to be performed comprises the controller circuitry to send the DMA request to the IOMMU based on the address search detecting a match between the DMA request and an entry of the registry.

In one or more nineteenth embodiments, further to the seventeenth embodiment or the eighteenth embodiment, the controller circuitry to selectively signal whether the operation with the DMA request is to be performed comprises the controller circuitry to signal that a communication of the DMA request to the IOMMU is to be prevented.

In one or more twentieth embodiments, further to any of the seventeenth through nineteenth embodiments, the controller circuitry to selectively signal whether the operation with the DMA request is to be performed comprises the controller circuitry to signal that the DMA request is to be modified to provide a value which indicates a type of memory access which is to be denied to the first endpoint device.

In one or more twenty-first embodiments, further to any of the seventeenth through twentieth embodiments, the entries comprise a first entry which comprises a first address and a bus-device-function value.

In one or more twenty-second embodiments, further to any of the seventeenth through twenty-first embodiments, the entries comprise a first entry which comprises a first address and a process address space identifier.

In one or more twenty-third embodiments, further to any of the seventeenth through twenty-second embodiments, the inspection unit is coupled between another inspection unit and the IOMMU, and wherein the controller circuitry is further to participate in a negotiation with the other inspection unit to determine which of the inspection unit or the other inspection unit is to maintain the registry.

In one or more twenty-fourth embodiments, further to any of the seventeenth through twenty-third embodiments, the controller circuitry is further to receive one or more second messages which indicates an assignment of workloads each to a respective agent, and signal the manager circuitry to create one or more other entries in the registry based on the one or more second messages.

Techniques and architectures for detecting unauthorized memory accesses are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
    a first hardware interface to couple the device to an input-output memory management unit (IOMMU);
    a second hardware interface to couple the device to a first endpoint device;
    manager circuitry to create entries of a registry of accessible addresses, the entries each based on a respective one of first messages received via the first hardware interface, wherein the first messages each indicate a completion of a respective address translation, the entries each to indicate an accessibility of a respective address by a respective endpoint device of one or more endpoint devices including the first endpoint device; and
    controller circuitry coupled to the manager circuitry, the first hardware interface, and the second hardware interface, the controller circuitry to receive a direct memory access (DMA) request from the first endpoint device, to signal the manager circuitry to perform an address search of the registry based on the DMA request, and to selectively signal, based on the address search, whether an operation with the DMA request is to be performed.

2. The device of claim 1, wherein the controller circuitry to selectively signal whether the operation with the DMA request is to be performed comprises the controller circuitry to send the DMA request to the IOMMU based on the address search detecting a match between the DMA request and an entry of the registry.

3. The device of claim 1, wherein the controller circuitry to selectively signal whether the operation with the DMA request is to be performed comprises the controller circuitry to signal that a communication of the DMA request to the IOMMU is to be prevented.

4. The device of claim 1, wherein the controller circuitry to selectively signal whether the operation with the DMA request is to be performed comprises the controller circuitry to signal that the DMA request is to be modified to provide a value which indicates a type of memory access which is to be denied to the first endpoint device.

5. The device of claim 1, wherein the entries comprise a first entry which comprises a first address and a bus-device-function value.

6. The device of claim 1, wherein the entries comprise a first entry which comprises a first address and a process address space identifier.

7. The device of claim 1, wherein the device is to be coupled between an inspection unit and the IOMMU, and wherein the controller circuitry is further to participate in a negotiation with the inspection unit to determine which of the inspection unit or the device is to maintain the registry.

8. The device of claim 1, wherein the controller circuitry is further to:
    receive one or more second messages which indicates an assignment of workloads each to a respective agent; and
    signal the manager circuitry to create one or more other entries in the registry based on the one or more second messages.

9. A system comprising
    a memory;
    an input-output memory management unit (IOMMU);
    a first endpoint device coupled to the memory via the IOMMU;
    an inspection unit coupled between the IOMMU and the first endpoint device, the inspection unit comprising:

manager circuitry to create entries of a registry of accessible addresses, the entries each based on a respective one of first messages received via a first hardware interface, wherein the first messages each indicate a completion of a respective address translation, the entries each to indicate an accessibility of a respective address by a respective endpoint device of one or more endpoint devices including the first endpoint device; and controller circuitry coupled to the manager circuitry, the controller circuitry to receive a direct memory access (DMA) request from the first endpoint device, to signal the manager circuitry to perform an address search of the registry based on the DMA request, and to selectively signal, based on the address search, whether an operation with the DMA request is to be performed.

10. The system of claim 9, wherein the controller circuitry to selectively signal whether the operation with the DMA request is to be performed comprises the controller circuitry to send the DMA request to the IOMMU based on the address search detecting a match between the DMA request and an entry of the registry.

11. The system of claim 9, wherein the controller circuitry to selectively signal whether the operation with the DMA request is to be performed comprises the controller circuitry to signal that a communication of the DMA request to the IOMMU is to be prevented.

12. The system of claim 9, wherein the controller circuitry to selectively signal whether the operation with the DMA request is to be performed comprises the controller circuitry to signal that the DMA request is to be modified to provide a value which indicates a type of memory access which is to be denied to the first endpoint device.

13. The system of claim 9, wherein the inspection unit is coupled between another inspection unit and the IOMMU, and wherein the controller circuitry is further to participate in a negotiation with the other inspection unit to determine which of the inspection unit or the other inspection unit is to maintain the registry.

14. The system of claim 9, wherein the controller circuitry is further to:
 receive one or more second messages which indicates an assignment of workloads each to a respective agent; and
 signal the manager circuitry to create one or more other entries in the registry based on the one or more second messages.

* * * * *